United States Patent
Czora

(10) Patent No.: US 7,499,893 B2
(45) Date of Patent: Mar. 3, 2009

(54) SYSTEM METHOD FOR SIMULATING CONCIOUSNESS

(75) Inventor: Gregory J. Czora, Mariposa, CA (US)

(73) Assignee: Blue Oak Mountain Technologies, Inc., Mariposa, CA (US)

( * ) Notice: Subject to any disclaimer, the term of this patent is extended or adjusted under 35 U.S.C. 154(b) by 0 days.

(21) Appl. No.: 11/294,622

(22) Filed: Dec. 5, 2005

(65) Prior Publication Data

US 2006/0142986 A1    Jun. 29, 2006

Related U.S. Application Data

(63) Continuation-in-part of application No. 09/802,505, filed on Mar. 8, 2001, now abandoned.

(51) Int. Cl.
    G06E 1/00    (2006.01)
    G06E 3/00    (2006.01)
    G06F 15/18   (2006.01)
    G06G 7/00    (2006.01)

(52) U.S. Cl. .......................................... 706/18; 706/62
(58) Field of Classification Search .................. 703/6
See application file for complete search history.

(56) References Cited

U.S. PATENT DOCUMENTS

| | | | |
|---|---|---|---|
| 6,459,955 B1 * | 10/2002 | Bartsch et al. | 700/245 |
| 6,522,951 B2 * | 2/2003 | Born et al. | 700/258 |
| 6,697,707 B2 * | 2/2004 | Peters, II | 700/245 |
| 6,718,533 B1 * | 4/2004 | Schneider et al. | 717/100 |
| 6,804,580 B1 * | 10/2004 | Stoddard et al. | 700/248 |
| 6,809,490 B2 * | 10/2004 | Jones et al. | 318/568.12 |
| 6,816,753 B2 * | 11/2004 | Sakamoto et al. | 700/245 |
| 6,865,429 B1 * | 3/2005 | Schneider et al. | 700/86 |
| 6,904,335 B2 * | 6/2005 | Solomon | 700/247 |
| 7,069,100 B2 * | 6/2006 | Monette et al. | 700/116 |
| 7,173,391 B2 * | 2/2007 | Jones et al. | 318/568.12 |
| 7,187,998 B2 * | 3/2007 | Okamoto et al. | 700/245 |
| 7,187,999 B2 * | 3/2007 | Okamoto et al. | 700/245 |
| 7,191,035 B2 * | 3/2007 | Okamoto et al. | 700/245 |
| 7,206,668 B2 * | 4/2007 | Okamoto et al. | 700/245 |
| 7,209,803 B2 * | 4/2007 | Okamoto et al. | 700/245 |

(Continued)

OTHER PUBLICATIONS

Bruce M. Blumberg; Old Tricks, New Dogs: Ethology and Interactive Creatures; Feb. 1997; URL: http://characters.media.mit.edu/Theses/blumberg_phd.pdf.*

(Continued)

*Primary Examiner*—Michael B Holmes
(74) *Attorney, Agent, or Firm*—Henneman & Assoc., PLC; Larry E. Henneman, Jr.

(57) ABSTRACT

A simulated consciousness method (10) for an improved human/computer interface. A computer system (12) is programmed to have a Digital Life Form (32) possessing a plurality of attributes (65). A plurality of actions (64) taken relative to objects (60) in the environment (30) contribute to simulated feelings (76) which ultimately control the viability of the Digital Life Form (32). When there are not sufficient energy packets (66) to sustain the Digital Life Form (32) then simulated death 52 results. Therefore, only actions (64) which contribute to the viability of the Digital Life Form (32) are repeated in the long-run. Some of those actions (64) include perception of reality, concept formation, and natural language processing.

26 Claims, 5 Drawing Sheets

U.S. PATENT DOCUMENTS

| | | | | |
|---|---|---|---|---|
| 7,211,980 | B1* | 5/2007 | Bruemmer et al. | 318/587 |
| 7,252,644 | B2* | 8/2007 | Dewald et al. | 601/5 |
| 7,257,237 | B1* | 8/2007 | Luck et al. | 382/103 |
| 7,275,237 | B1* | 9/2007 | Schneider et al. | 717/108 |
| 7,286,888 | B2* | 10/2007 | Monette et al. | 700/95 |
| 7,295,892 | B2* | 11/2007 | Herr et al. | 700/245 |
| 7,312,766 | B1* | 12/2007 | Edwards | 345/8 |
| 7,343,222 | B2* | 3/2008 | Solomon | 700/245 |
| 7,388,343 | B2* | 6/2008 | Jones et al. | 318/587 |
| 7,429,843 | B2* | 9/2008 | Jones et al. | 318/568.12 |

OTHER PUBLICATIONS

Paulo Heleno and Manuel Próspero dos Santos; Artificial animals in virtual ecosystems; Mar. 1999; URL: http://www.ingentaconnect.com/content/els/01697552/1998/00000030/00000020/art00174.*

Xiaoyuan Tu; Artificial Animals for Computer Animation: Biomechanics, Locomotion, Perception and Behavior; 1999; URL: http://www.dgp.toronto.edu/people/tu/psThesis/Part1.pdf.*

Terzopoulos, D. "Artificial Life for Computer Graphics", 1999 Communications of the ACM, vol. 42, Issue 8, Aug. 1999.*

Bruce M. Blumberg, "Old Trucks, New Dogs: Ethology and Interactive Creatures", Feb. 1997, http://web.media.mit.edu/~bruce/Site01.data/tricks.pdf (Full Version).*

Design on Measurement and Control System of Cleaning Robot Based on Sensor Array detection Guangzhi Dai; Tiequn Chen; Control and Automation, 2007. ICCA 2007. IEEE International Conference on May 30 2007-Jun. 1, 2007 pp. 1319-1322 Digital Object Identifier 10.1109/ICCA.2007.4376574.*

Bayesian position estimation of an industrial robot using multiple sensors Karlsson, R.; Norrlof, M.; Control Applications, 2004. Proceedings of the 2004 IEEE International Conference on vol. 1, Sep. 2-4, 2004 pp. 303-308 vol. 1.*

Vision Based Intelligent Control for Mobile Robot Gang Peng; Xinhan Huang; Jian Gao; Yi Wu; Intelligent Control and Automation, 2006. WCICA 2006. The Sixth World Congress on vol. 2, Jun. 21-23, 2006 pp. 9124-9128 Digital Object Identifier 10.1109/WCICA.2006.1713765.*

The structure design and dynamics analysis of an autonomous over-obstacle mobile robot Wang Furui; Wang Dexin; Dong Erbao; Chen Haoyao; Du Huasheng; Yang Jie; Industrial Technology, 2005. ICIT 2005. IEEE International Conference on Dec. 14-17, 2005 pp. 248-253 Digital Object Identifier 10.1109/ICIT.2005.1600644.*

Sensor-based robot systems Harashima, F.; Dote, Y.; Industrial Electronics, 1992., Proceedings of the IEEE International Symposium on May 25-29, 1992 pp. 10-19 vol. 1 Digital Object Identifier 10.1109/ISIE.1992.279628.*

Development of a flexible tactile sensor system for a humanoid robot Kerpa, O.; Weiss, K.; Worn, H.; Intelligent Robots and Systems, 2003. (IROS 2003). Proceedings. 2003 IEEE/RSJ International Conference on vol. 1, Oct. 27-31, 2003 pp. 1-6 vol. 1 Digital Object Identifier 10.1109/IROS.2003.1250596.*

Motion control of robot manipulators under sensor failure Gu, J.; Meng, M.; Cook, A.; Intelligent Control and Automation, 2000. Proceedings of the 3rd World Congress on vol. 1, Jun. 28-Jul. 2, 2000 pp. 73-78 vol. 1 Digital Object Identifier 10.1109/WCICA.2000.859918.*

Experimental industrial robotics Nilsson, K.; Johansson, R.; Bolmsjo, G.; Olsson, G.; Decision and Control, 1996., Proceedings of the 35th IEEE vol. 4, Dec. 11-13, 1996 pp. 3904-3909 vol. 4 Digital Object Identifier 10.1109/CDC.1996.577290.*

* cited by examiner

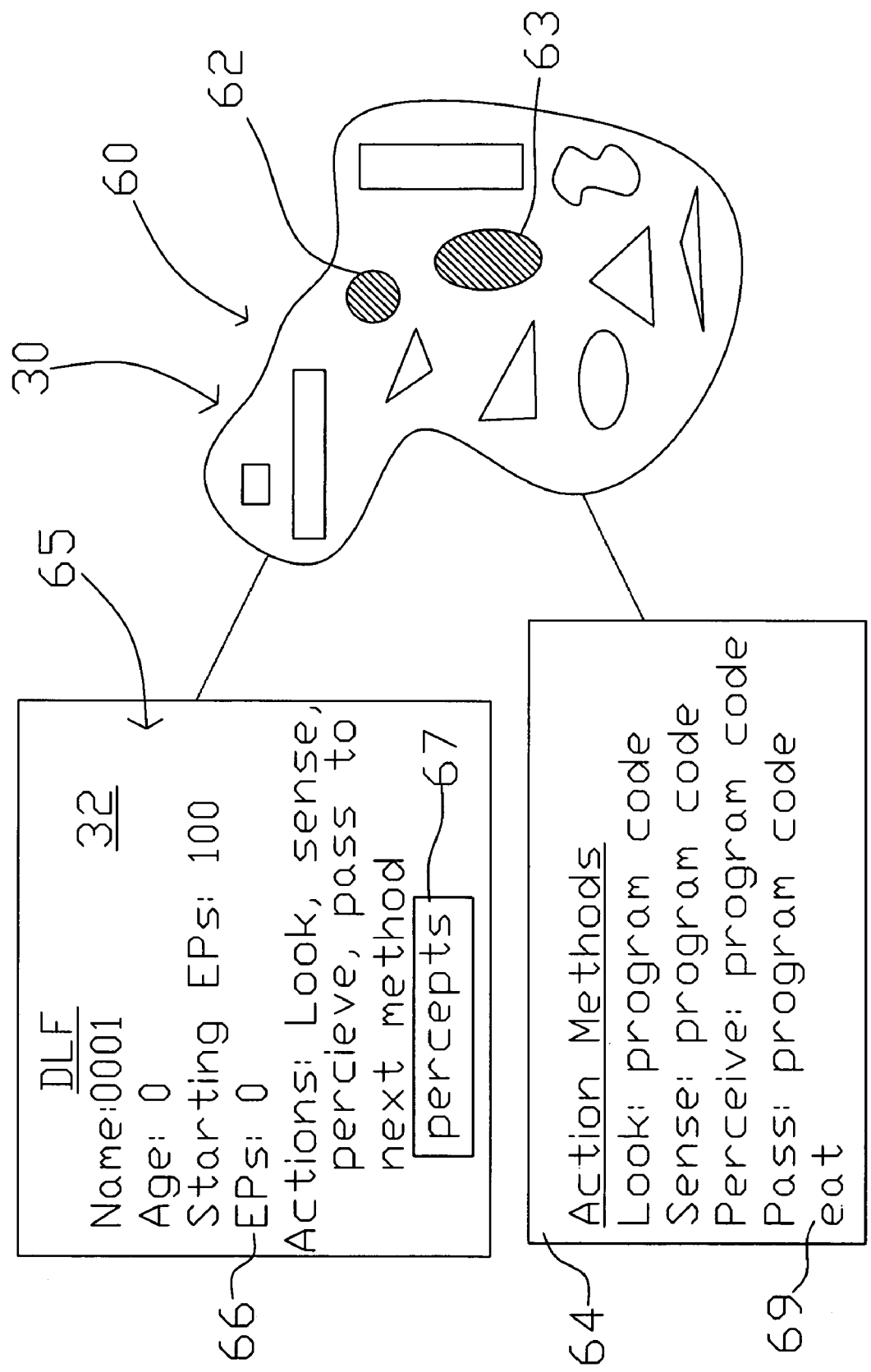

SYSTEM METHOD FOR SIMULATING CONCIOUSNESS

RELATED APPLICATIONS

This application is a continuation-in-part of U.S. patent application Ser. No. 09/802,505, filed Mar. 8, 2001 now abandoned by the same inventor, which is incorporated herein by reference in its entirety.

COPYRIGHT NOTICE

A portion of the disclosure of the patent document contains material which is subject to copyright protection. The owner has no objection to the facsimile reproduction by any one of the patent disclosure, as it appears in the Patent and Trademark Office patent files of records of any country, but otherwise reserves all rights whatsoever.

TECHNICAL FIELD

The present invention relates to the field of software for computers and related devices, and more particularly to a method for causing a computer or other such device to interact with human beings as though the device has human like consciousness. The predominant current usage of the present inventive method for simulating consciousness is in the improvement of communication in human/machine interaction.

BACKGROUND ART

It is known in the art to cause a computer to emulate certain functions that are traditionally associated with human behavior. For example, efforts at artificial intelligence ("AI") generally attempt to provide knowledge in response to inquiries. However, known AI systems merely respond with information that has been programmed into them. That is, a machine programmed with an AI program merely responds in the manner in-which its human programmers provided for when the program was written.

Experiments in the field of artificial life ("AL") attempt to cause a machine to function or respond to external stimuli in a manner generally associated with a living organism. While such experiments are providing a foundation for future useful devices, the machine/human interface is not much enhanced by the present state of the art in this field.

It is recognized in the field that it would be valuable to have a computer which does not respond in some preprogrammed automatic manner. Genetic algorithms have been devised which attempt to get around this problem by emulating or recapitulating evolution, in the hope that eventually intelligence will emerge. Neural networks have attempted to do something similar by emulating the function of neurons in higher life forms. While it is possible that these methods might eventually help to solve some aspect of the problem, there has not yet been any useful benefit derived from such experiments.

It would be beneficial to have a machine/human interface which approaches the flexibility of a human/human interface. However, all known efforts in the field have been limited to either providing a particular preprogrammed response to an inquiry, or else have not provided a useful interface between a user and the machine.

DISCLOSURE OF INVENTION

Accordingly, it is an object of the present invention to provide a machine/human interface which reacts to stimuli in a manner generally associated with an animal or a human being.

It is still another object of the present invention to provide a machine which simulates consciousness.

It is yet another object of the present invention to provide a computer program which will cause a computer to develop a simulated consciousness.

It is still another object of the present invention to provide a method and apparatus for interfacing with a human being as though said apparatus possesses consciousness.

It is yet another object of the present invention to provide a method and apparatus for causing a machine to appear to possess consciousness.

It is still another object of the present invention to provide a method and apparatus for improving a computer/user interface.

It is yet another object of the present invention to provide an improved computer/user interface.

Briefly, a known embodiment of the present invention is a computer program which establishes goal directed behavior. A computer is programmed to define actions which can either increase or decrease simulated happiness scores and which can result either in the continued existence of a simulated life form or else the demise thereof. Only actions which tend to perpetuate the simulated life will be repeated in the long run. In this manner, a Digital Life Form will be goal directed and will, therefore, act in a manner much as though it is alive and has actual consciousness. The Digital Life Form can exist entirely within a computer program for simulation purposes, or can be tied to the "real world" using sensors, and the like, for practical applications.

The Digital Life Form, thereby, acts as a teleological agent. An advantage of the complexity of teleological agents is that they can find ways to do tasks for which they were not programmed.

According to the present invention, simulated consciousness is a series of discrete causal steps performed by program methods that repeat or cycle operations which a programmer turns into a process by putting them into a loop internal to the Digital Life Form, in order to simulate its life and consciousness. The program continuously cycles through these several program methods, thus effecting the simulation. It is an important aspect of the invention that while some of the behaviors of the Digital Life Form are preprogrammed, others are emergent behaviors. That is, the behaviors emerge from the interaction of the Digital Life Form with its environment and its own previous actions. Emergent behaviors are not necessarily predictable from the program code because the environment is not necessarily predictable. The process steps to simulate consciousness run in a subsystem layer above those of the Digital Life Form's simulated life processes, and the program methods that implement them are to cause the Digital Life Form to perceive its environment, evaluate objects therein, select an action, act, and record the action and results thereof to memory. Such action is repeated ad infinitum so long as the Digital Life Form remains "alive" and, as with biological life forms, the action may follow any of a variety of paths because the circumstances in the Digital Life Form's environment are not necessarily predictable. The result is a very realistic simulation.

An advantage of the present invention is that a machine can interface with a human being in a manner generally associated with a human to human interaction.

A further advantage of the present invention is that it is easier for a human to interface with and use a computer.

Yet another advantage of the present invention is that a computer can be caused to develop a simulated consciousness with only a minimal amount of programming.

Still another advantage of the present invention is that it will be easier and more natural to use a computer or computerized machine.

Yet another advantage of the present invention is that it will be readily implemented using available computer hardware and input/output devices.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application.

Further, those skilled in the art will recognize that various embodiments of the present invention may achieve one or more, but not necessarily all, of the above described objects and advantages. Accordingly, the listed advantages are not essential elements of the present invention, and should not be construed as limitations.

BRIEF DESCRIPTION OF THE DRAWINGS

FIG. 3 is a simulated environment, including a digital life form, according to the presently described embodiment of the invention;

DETAILED DESCRIPTION OF THE INVENTION

While this invention is described in terms of modes for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

Figure 1:
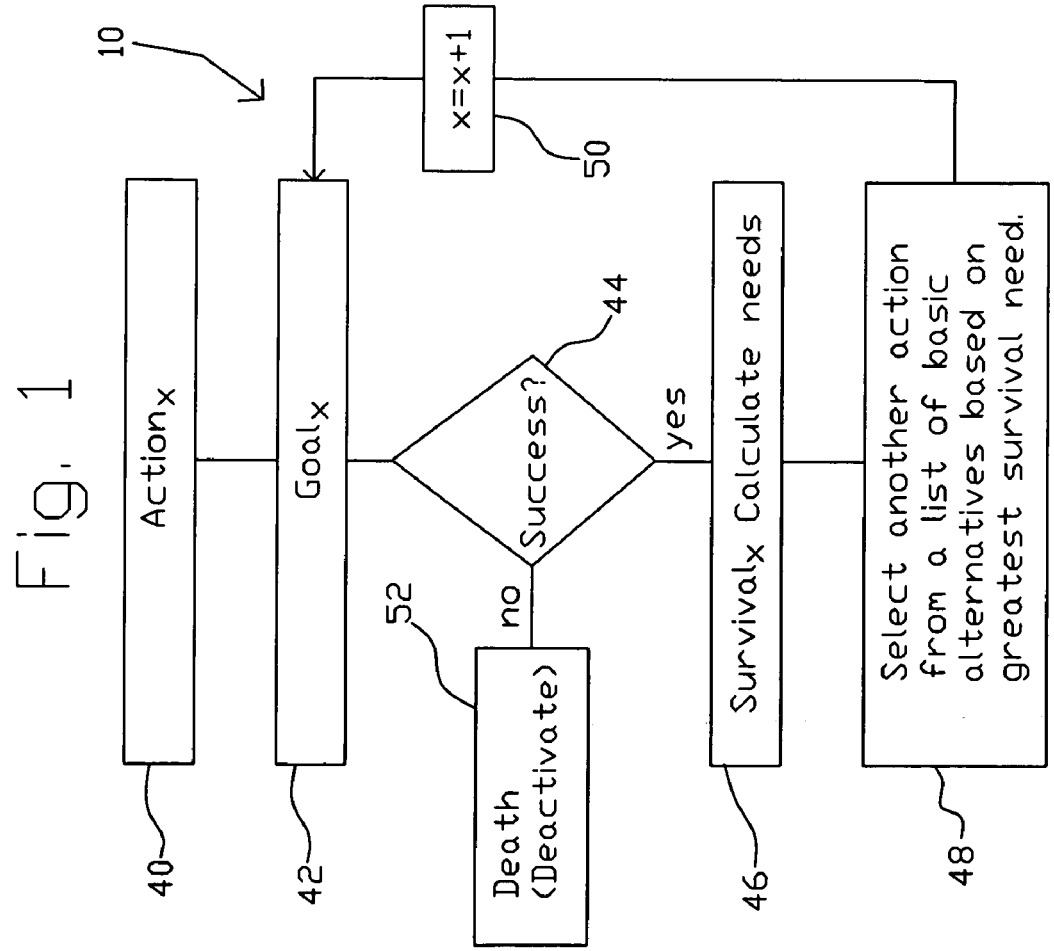
FIG. 1 is a flow diagram depicting an embodiment of a simulated awareness method, according to the present invention.
Figure 2:
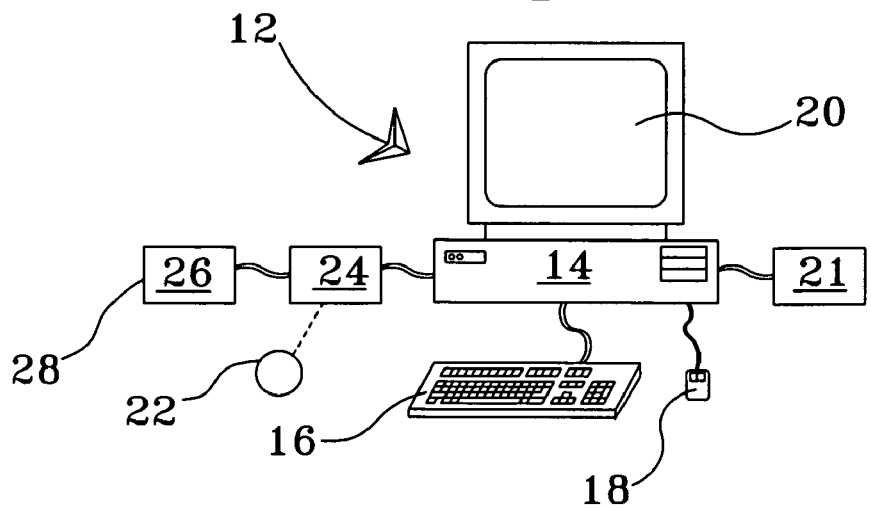
FIG. 2 is a diagrammatic view of a general purpose computer system such as may be used for practicing the present inventive method.

A presently known mode for carrying out the invention is a computer program, operative on a general purpose computer, for accomplishing the inventive method as described herein. An example of an inventive simulated awareness method is depicted in a flow diagram in FIG. 1 and is designated therein by the general reference character 10. FIG. 2 is a block diagram of a computer system 12 such as is anticipated to be used to accomplish the simulated consciousness method 10. Illustrated is a general purpose computer 14, having the usual appendages such as a keyboard 16, a pointing device 18 (generally a mouse), a display screen 20, and a printer 21, a removable medium 22 (such as a floppy disk or CD ROM) in a removable medium drive 24, and a fixed medium drive 26. The inventive simulated awareness method 10 will generally be stored upon the removable medium 22 for downloading into the fixed medium drive 26 of the computer system 12. In addition, a data base 28 consisting of a data to be used with the present inventive method will generally be stored on the fixed medium 26.

According to the present inventive method, goal directed behavior is used to simulate the sort of response usually associated with a conscious being. A primary goal is the "survival" of a digital life form ("DLF"). A diagrammatic representation of a simulated environment 30 including a DLF 32 is depicted in the view of FIG. 3 and will be discussed in greater detail, hereinafter.

In the presently described example of the invention, the "life" of the DLF 32 is represented numerically in the computer system 12. This simple concept will be familiar to those practiced in the art of computer games, wherein a numerical score is used to represent the relative vitality of a character. However, an essential difference here is that the vitality of the DLF is maintained by the actions of the DLF itself, and as such it is a conditional entity.

Referring again to FIG. 1, the simulated awareness method 10 functions as an endless loop (with exceptions as discussed hereinafter) wherein an action 40 attempts to achieve a goal 42 which, if successful, as determined in a success decision operation 44, will result in the survival 46 of the DLF 32 (FIG. 3). Subsequently, another action 40 is selected in a select action operation 48, and an experience tally 50 is incremented. These operations will be discussed in more detail hereinafter. As can be seen in the view of FIG. 1, should the action 40 not be successful (or alternatively, should successive actions not be successful, as will be discussed hereinafter), then the DLF 32 is deactivated, simulating the "death" 52 of the DLF 32, as consistent with its conditional nature.

The present inventive DLF 32, as with any life form, must cause its own future existence (survival) precisely because it is a goal directed or internally driven entity, as opposed to a rock, which is not goal directed. Any actions of a rock are simply the result of outside forces. Failure to maintain goals causes the life form to cease to exist, a condition in which it is no longer part of reality and one that is irreversible. Only behaviors that are successful will be repeated in the long run, as will be discussed in more detail, hereinafter.

Prior to the present invention, there has been a profound and fundamental difference between state of the art computer systems and biological life forms, between mechanical/logical systems and teleological systems. If something is a real life form, that is, if it is alive, it must be conditional, because that is the essential attribute of all life forms. The artificial life form (DLF 32) should therefore be goal directed, which means that it be internally driven by its own values, energy source, internal locus of control, and the value significance to itself of its own values (what it needs to stay alive). In order to act according to the present inventive method, the DLF 32 should have values (or an equivalent thereof) and act to gain and keep them on its own power. Simulated death is the primary means this invention uses to solve the problem of the apparent need to predefine a simulated life form's future actions. Simulated death solves this problem because only pro-life actions get repeated in the long run. DLFs 32 that fail in pro-life actions or attempt anti-life actions cease to exist and therefore can no longer act. Thus they have no long term causal significance in the simulation.

Referring again to FIG. 3, it can be seen that in the simulated environment 30 the DLF 32 exists along with a plurality of external objects 60. These objects could represent things such as food 62, which would contribute to the viability of the DLF 32. Another example would be that an object 63 could represent a threat to the DLF 32 if the DLF 32 does not take action to avoid it.

According to the present inventive method, a DLF 32, just like a living organism, must take in materials and energy from the environment 30, and it must use the appropriate materials and energy for self maintenance, self repair and self reproduction. And, also like a living organism, once the DLF 32 has died, it cannot be reconstituted—failure is irreversible. In order for a DLF to appear to have consciousness, its primary purpose cannot be to achieve human goals, which is how conditional programming structures are used in all state of the art computer programs, but the goals of the DLFs 32 themselves.

This means that DLFs 32 must be logically structured to take action to maintain their existence, and that they must be deleted if their survival actions fail.

Accordingly, the DLFs 32 must be equipped with a pallet of potential actions 64 through which it can interact with the objects 60 in its environment 30. Human programmers can predefine basic actions such as look, find, or eat, to build a starter simulation system goal directed action refers to actions (or sequences of basic actions) selected by a life form for survival purposes.

Still referring to the view of FIG. 3, it can be seen that the DLF 32 has several attributes 65, examples of which are shown in FIG. 3. In a slightly more sophisticated example, the DLF 32 might possess simulated "feelings". An example of attributes 65 for a DLF possessing simulated feelings might be as follows:

1. Name: 006023
2. Age: 84
3. Starting Energy Packets ("EPs"): 100
4. Current EPs: 350
5. Current percepts: P1, P2, . . . Pn
6. Actions Available: Look, Find Food, Eat, Stop
7. Simulated Feelings:
   a. Hunger/Fullness: −2
   b. Interest/Boredom: +3
   c. Company/Loneliness: +2
   d. Clarity/Confusion: +5
   e. Activity/Laziness: −1
   f. Confidence/Fear: +2
   g. Happiness: 1.5

A programmer skilled in object oriented programming can make simulated feelings attributes of a class of DLF 32 program objects. The simulated feelings give the DLF 32 an instantaneous indication of its life status, and, if put into a window on the computer screen as part of a DLF 32 program interface, a human observer can see the same status. By being conscious of its own life status, a DLF 32 can take actions to cause its future survival, since it would have the information that is a prerequisite to such actions. Simulated feelings are the simplest form of simulated self awareness or self consciousness, though at this level a DLF 32 is not aware that it is aware of itself.

As can be seen from the example above and that of FIG. 3, a DLF 32 can have attributes 65 such as a quantity of energy packets ("EPs") 66 which represent its degree of vitality. When a DLF 32 reaches zero EPs 66, its life would end. Therefore, maintaining an adequate energy supply (sufficient EPs 66) becomes the basis for all other actions a DLF 32 may be capable of performing. Therefore, once the DLF 32 programming object has been created and defined, processes called methods (object oriented computer programming code) must be defined to enable the DLF 32 to take action and an action selection method to enable internal control of its actions to find simulated food in its simulated environment to generate more EPs 66. This must be a continuous process to enable the DLF 32 to survive, just like a biological life form. These methods define the actions 64 depicted in the view of FIG. 3.

As seen in the view of FIG. 3, the DLF 32 can include one or more percepts 67. As defined herein, a percept 67 is a list of the perceived characteristics of the objects 60 that is calculated from input sensed by the DLF 32 from the objects 60 in its environment 30. Each percept 67 is a list of the properties and values (property measurements) of a corresponding object 60. To the DLF 32, the percepts 67 are the identities of the objects 60. Therefore, the percepts 67 are the processing units of simulated perceptual consciousness in a DLF 32, as will be discussed in more detail hereinafter.

As with the DLF 32 program object itself, the program objects 60 in the DLF's 32 simulated environment 30 must be created and defined (to save resources and make the system simpler during initial development), but since these objects 60 are non-conditional (non-living), most need few action methods for simple reality simulations. More complex and sophisticated simulated environments (not shown) in which non-living objects are animated (or contain other DLFs 32), would however, require coding extensive action methods for those objects. For this reason, at some point in the development of the system, it will become desirable to use objects sensed in the real world as with TV cameras, microphones, pressure sensors, and the like, to eliminate the need for such extra program coding and put the DLFs to practical real world use.

By way of example, the program code for an "Eat" method 69 can automatically include digestion, generating energy EPs 66, and the simulated feeling of being "full". The code for a "Stop" method, in this example, is a simple loop that continuously tests for feeling of fullness, and stops the Eat method when that condition is met. The code for the Death 52 method erases the current DLF 32 from the computer's memory and calls the Birth method which increments the DLF 32 name attribute by one and resets the other attributes to initial conditions.

It will be advantageous to save pro-life behaviors and maintain them between generations of the DLFs. This may be done by not erasing the behaviors from memory at simulated death 52, thereby simulating genetic evolution to carry the behaviors forward to the next generation of DLFs 32. Alternatively, some other method not yet contemplated by the inventor might be used for this purpose. In any event, it is important that the only actions that get repeated long term are the valuable actions. Life forms (DLFs 32) that repeat any other kind of actions simply get wiped out and no longer exist, and only actions of those DLFs 32 that are relatively successful should be carried forward to subsequent generations.

The complexity of the program code for sensing the environment 30 will differ greatly depending on whether the environment for a DLF 32 is simulated or real. The two types of environment are essentially equivalent, except that real sensors sensing reality provide much more accurate and detailed real time data of the world, whereas simulated worlds are limited to human imagination and computing resources. Simulated environments are primarily useful for developing, testing, and proving program methods while conserving resources. Sophisticated simulations intended for practical uses will need to interact with the real world to be effective.

Figure 4:
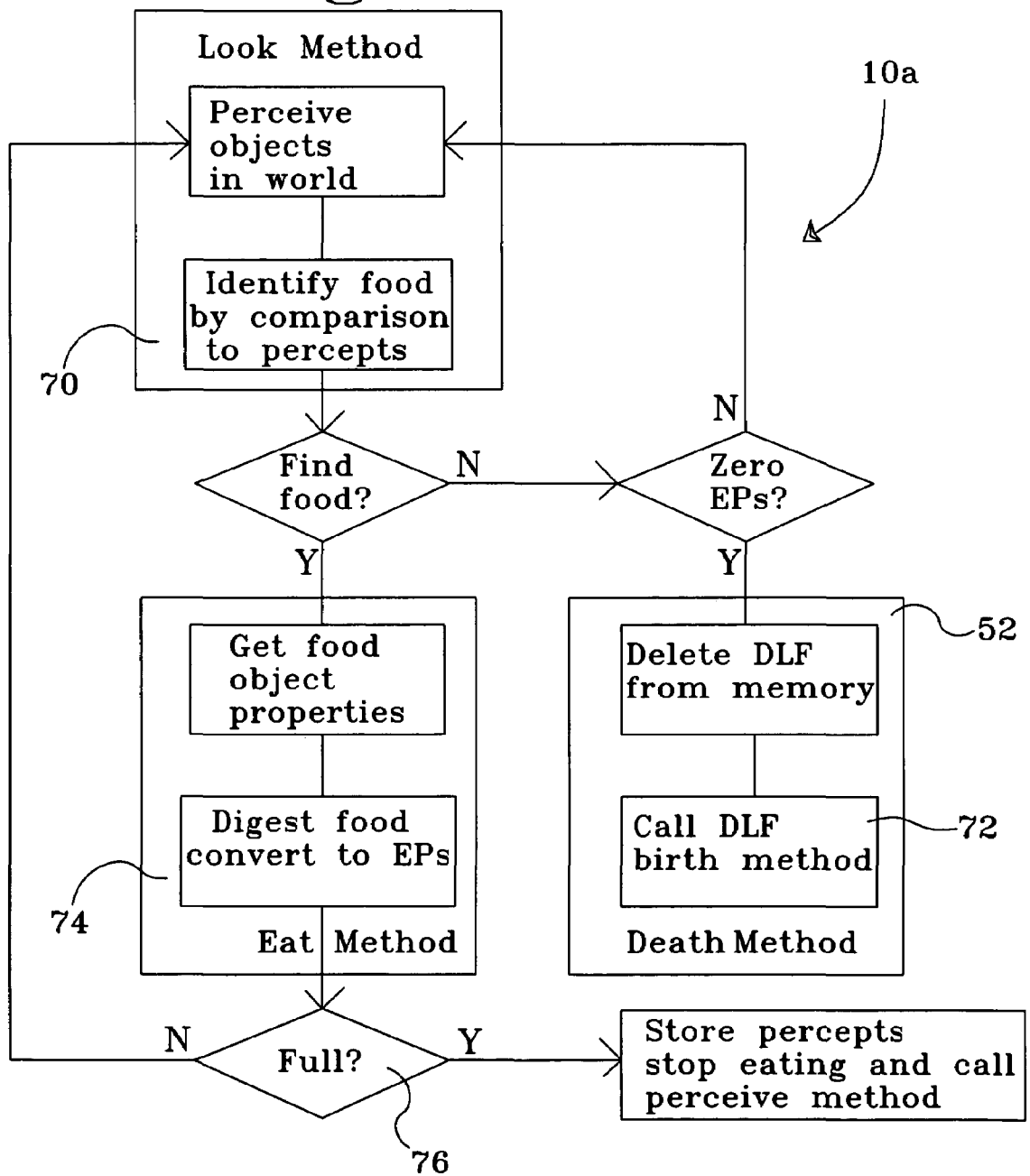
FIG. 4 is a flow diagram depicted a somewhat more complicated simulated consciousness method.

An example of a slightly more complex simulated consciousness method 10*a* is depicted in the view of FIG. 4. In a perceive environment operation 70 objects 62 in the environment 30 are located and then identified. In this simple example, the only objects 60 of interest are food 62. If food is not found, a check is made to determine if there are sufficient EPs 66 to maintain existence. If not, the death 52 operation is called, wherein the DLF 32 is deleted from memory and a birth operation 72 is called to create a new DLF 32. If there are EPs 66 to continue, the loop returns to the perceive environment operation 70. When food 62 is identified, the program proceeds to an eat operation 74 wherein the food 62 is assimilated and used to create EPs 66. This process is continued until there is no more food 62 immediately available or else until the DLF 32 is "full"—that is, until it has achieved its maximum quantity of EPs 66.

As can be appreciated in light of the above discussion and the flow diagram of FIG. 4, once various objects 60 have been perceived by a DLF 32, they must be evaluated with the DLF's 32 life as the standard of value. To a biological life form, since its continued existence is conditional, every percept is either a value or a disvalue relative to its life. That is, every percept has value significance to the life form as being information about its world that is either for or against its life. In order for a DLF 32 to be an accurate simulation of a life form, therefore, a DLF 32 should also be able to determine the value significance of its percepts 67 (FIG. 3). One way to accomplish this is to simulate pleasure and/or pain, in much the same way the other generally biological functions have been simulated as discussed previously herein. For example, in FIG. 4, a "feeling" operation 76 calculates whether or not the DLF 32 is experiencing the feeling of being "full". In like manner other feelings can be simulated.

Figure 5:
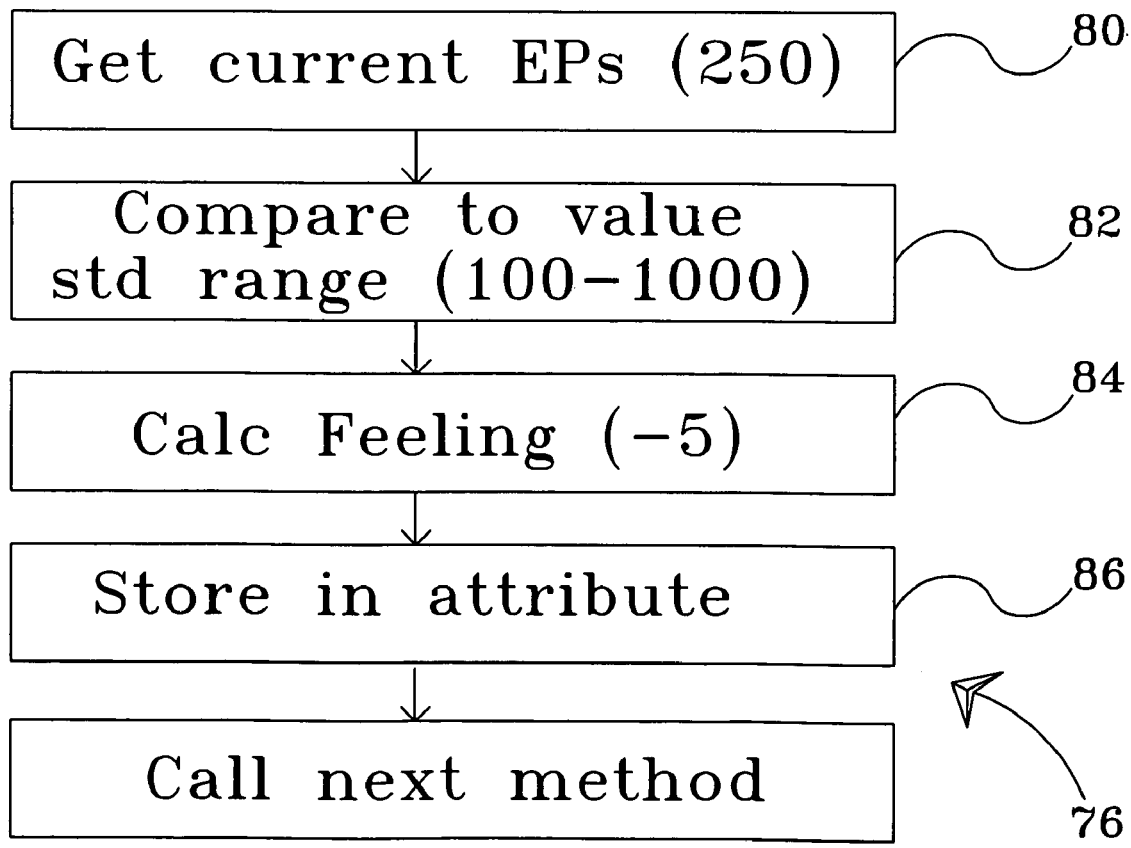
FIG. 5 is a flow chart depicting a simulated feeling, as shown in FIG. 4.

The pleasure/pain systems of biological life forms are automatic, built in value systems. In general, things that are good for a life form cause it to feel pleasure, and things that are bad for it cause it pain (either physical, emotional, or both). In order to create a digital simulation of a life form a similar automatic, built in evaluation system is desirable and, like actions, this can be copied from biological life forms and predefined so evolution does not have to be recapitulated by DLFs 32. Since computers are not biological, simulated pleasure and pain must be calculated based on simulated values which serve as standards with the life of a DLF 32 being the ultimate standard. The ideal is to make simulated evaluations as causally and functionally equivalent to the biological ones as is technically possible. An example of a flow chart for calculating a simulated feeling is depicted in the view of FIG. 5. For example, to calculate if the DLF 32 feels "full" in computational terms, a method is written that compares the number of EPs 66 that a DLF 32 has with the range that its simulated life requires. Having EPs 66 is a value to a DLF's 32 life; without them the DLF 32 will die just as a biological life form will die without food. A simulated feeling 76 can be calculated for any number of EPs 66 a DLF 32 has at any specific time by comparing the number it actually has to its required range. As can be seen in the view of FIG. 5, in this example, the feeling 76 is calculated by a getting current EPs operation 80, then a comparing value operation 82 wherein the current EPs 66 are compared to a set range of acceptable values, then the feeling 76 is calculated in a calculate feeling operation 84, based upon where the current EP 66 quantity lies within this spectrum. Finally, the calculated feeling 76 is stored as an attribute of the DLF 32 in a store attribute operation 86. The attributes of the DLF 32 are discussed above and in relation to FIG. 3.

Early in a DLF's 32 life, when there are few examples of percepts 67 and how the DLF's 32 previous actions changed them, most of the DLF's 32 actions will be selected by trial and error. However after an extended life and, perhaps, many thousands of perception/action events, the action selection methods will have much more data to use and will, therefore, be able to select actions with the greatest survival value more efficiently. The operating principle here is that identity (processed data in the "memory" of a DLF 32 determines action capacity. As the amount of data increases in the DLF the identity of the DLF effectively changes in a way that increases its action capacity, just as occurs in biological life forms to varying degrees. Some examples of action strategies that might be provided by a programmer are as follows:

Continue the last action: This is a useful strategy when an action is succeeding in improving simulated feelings (such as eating to reduce hunger). Select the action that resulted in pleasure in the past when a given object was perceived: This option is similar to the previous one, but is recalled from a memory association from the past.

Select no action: This is a useful option when all simulated feelings are positive and no action is required to change them. It is also an example of an optional action. Follow a pre-programmed process (when a given object is perceived, as with instinctual behavior in biological life forms such as nest building, or habits in humans): This option is a good strategy for a goal requiring complex actions or series of actions. Random action selection: This option is analogous to trial and error actions observed in biological life forms and is useful for new situations when no other action gets selected. It is another example of an optional action.

According to the present invention, actions are not preselected, but rather are selected by simulating the perceptual consciousness process and, as with its biological counterpart, this process is an automatic one (in the teleological sense). There is no other basis for making selections because options are limited at the perceptual level of awareness to the objects in the DLF's 32 world and the DLF's 32 own simulated pleasure-pain responses to those objects. However, action selection is teleological because its goal is a DLF's 32 survival, the DLF's 32 simulated life is the standard of value and it, therefore, cannot be explained as simple mechanistic, billiard ball type of causality.

When creating action selection methods the following points should be considered. An action selection method should insure that some action is always selected for any perceptual event (even a "no action" method is an action in this context). An action selection method should be teleological in that its goal is causing the survival of the DLF 32 with its simulated life as the standard value, and does so by increasing the DLF's 32 simulated happiness. Only survival actions get repeated in the long run. "No_Act" and/or "Random_Act" methods can allow for a DLF 32 to maintain its simulated happiness for a time, provide for trial and error actions, and allow for the unexpected or the novel event to be simulated.

Figure 6:
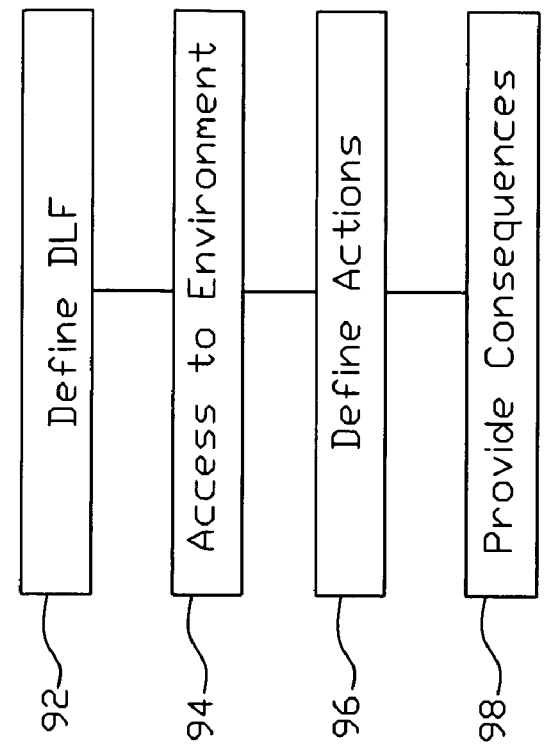
FIG. 6 is a flow diagram depicting an example of a method for creating a simulated consciousness.

It will be recognized by one skilled in the art that after a great many "experiences" by the DLF there will accumulate a great deal of data. Therefore, it may be desirable to divide the data base 28 (FIG. 2) to have both short and long term storage wherein much of duplicate short term information is deleted FIG. 6 is a flow diagram depicting an example of a process 90 for creating a simulated consciousness method 10. In the example of FIG. 6, it can be seen that in a define DLF operation 92 the attributes 65 for a DLF 32 are determined and defined, and provision is made to store such in the data base 28 of the computer 14. Again, one skilled in the art of object oriented programming will appreciate that this is a relatively simple process. In a provide access to environment operation 94 provision is made for allowing the DLF 32 to perceive its environment 30. As discussed previously, herein, the nature of this operation will vary according to the nature and complexity of the environment 30. If the environment 30 is entirely simulated, as in the simple example of FIG. 3, then the programmer can merely define the objects 60 in the environment 30 as program objects. Alternatively, if the DLF 32 were to be intended to operate in the "real world" then sensors could be provided to sense real world objects (not shown) and identify them. The technology for this currently exists and is being further developed, and is not an aspect of this particular invention.

In a provide selection of actions operation 96, a programmer will define selected actions 64, as previously discussed herein, and will further define the circumstances under which particular actions 64 will be selected. In a define consequences operation 98, the programmer will provide for the simulated feelings 76 which will assist in determining the appropriate action 64. Also, as previously discussed herein, the consequence of simulated death 52 and birth will be programmed.

Figure 7:
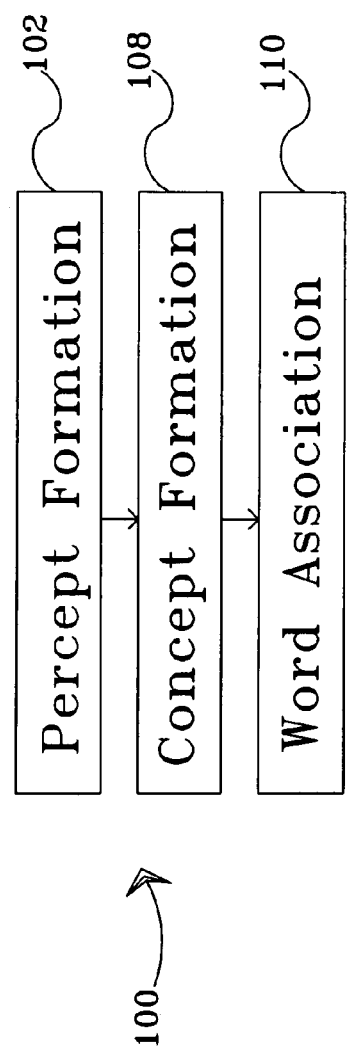
FIG. 7 is a diagrammatic representation of a hierarchical process according to the present invention.

FIG. 7 is a diagrammatic representation of a hierarchical process 100 such as will enable a DLF 32 to achieve simulated consciousness. As can be seen in the view of FIG. 1, the DLF 32 will first form percepts 67 in a percept formation operation 102 such as has been discussed previously herein. It should be noted that many percepts 67 will be created, essentially one for each object 60 or entity encountered in the environment 30 of the DLF 32, and these percepts 67 are the identity of that object 60 (properties and measurements). Therefore, the diagram of FIG. 7 is not a flow diagram, but rather a hierarchical diagram showing the levels of operation of the DLF. As can be appreciated by one skilled in the art the percept formation operation 102 will be repeated, as necessary, as objects 60 are encountered in the environment 30.

Figure 8:
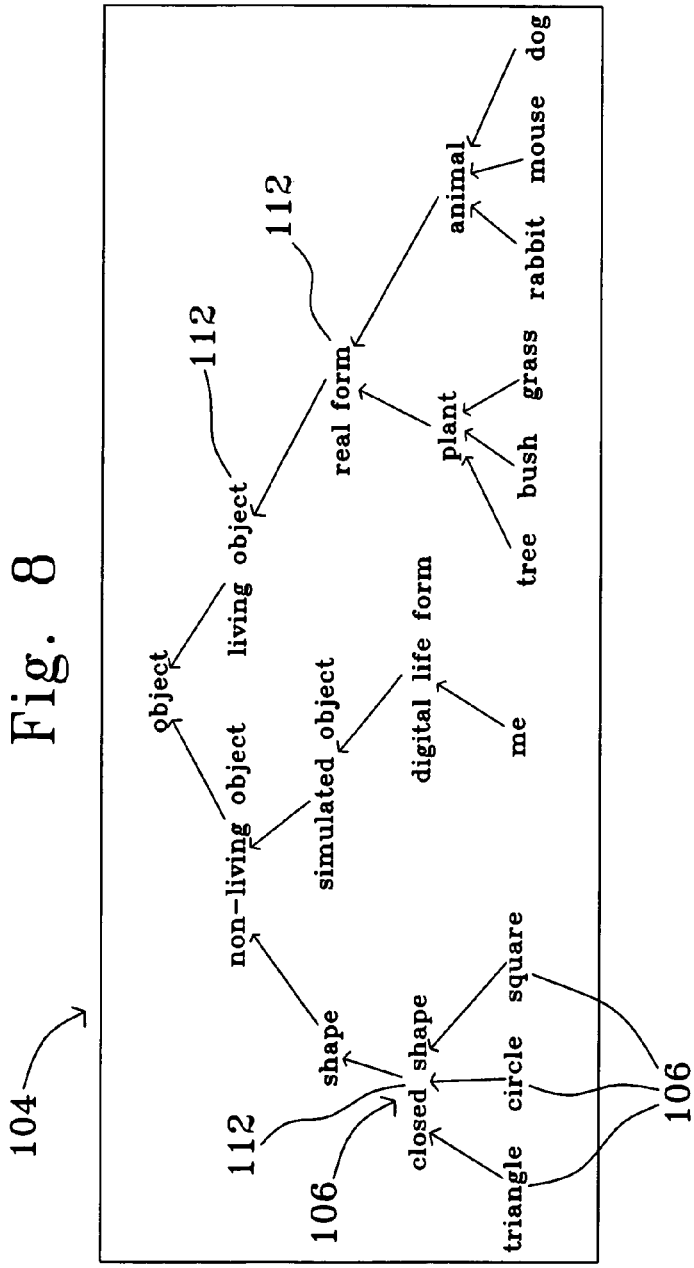
FIG. 8 is a diagrammatic representation of a concept chain such as might be formed according to the present invention.

FIG. 8 is an example of a concept chain 104, which will be discussed hereinafter in relation to the remainder of FIG. 7. When the DLF 32 has stored sufficient percepts 67 to make comparisons, a concept 106 can be formed by such comparison. For example, any shapes which are closed, and comprised of three straight sides and three corners can be grouped together to form a concept 106 "triangle". When sufficient concepts 106 have been formed for comparison, these can be compared to make additional concepts 106. In the example of FIG. 8 it can be seen that the concepts 106 "triangle", "circle" and "square" have similar characteristics which can be grouped under the concept 106 "closed shape". In like manner, the entire concept chain 104 of FIG. 8 can be formed, given sufficient experience by the DLF 32. Higher and lower level (more abstract) concepts 106 are formed by comparing the attributes of other concepts 106, as can be seen in the view of FIG. 8. This means both more general and more specific concepts 106 can be formed at any point in the mid levels of the hierarchy of concepts. Concepts 106 can therefore identify any kind of relationship between percepts 67, and at all levels of complexity, but they all must be connected by unbroken chains to perceived objects in the DLF's 32 world at some point.

It should be noted that concepts 106 start being formed by comparison of certain particular attributes of percepts 67. For example, looking only at the relative position of objects 60 can lead to the formation of concepts such as "above", "to the right of" and the like. Likewise, concepts can be formed relating to intangibles. That is, concepts are calculated for objects, actions, relationships and even for other concepts.

Referring again to FIG. 7, it can now be appreciated that a next level of operation of the DLF 32 following percept formation 102 will be concept formation 108, wherein concepts 106 are formed, as discussed above. One skilled in the art will recognize that concept formation 108 will not be an inherent characteristic of a DLF 32, but rather will be provided for as one of the actions 40 available to the DLF (much like "eat", or the like), which have been discussed previously herein and may require multiple simulated conscious loop cycles to complete.

It should be noted that the formation of concepts 106 does not inherently provide for a name for the concepts such as have been used to discuss the example of FIG. 8. That is, just because the DLF 32 recognizes the similarities between objects such that it can group all triangular shaped objects together by such similar characteristics, that does not mean that the DLF will understand that these are called "triangles" in English or by some other name in other languages. The concept 106 without a word associated (its name) may be referred to as an "implicit concept", wherein the DLF 32 has the data to form a concept, but does not yet have a name for it. It is a real, workable data structure in the system, but not yet linked by association to the DLF's 32 symbol system. As discussed above, concept formation is a form of simulated volitional (free-will, or optional) behavior. Percepts 67 are calculated automatically (in a teleological, not mechanistic sense)., Concepts 106, however, are calculated only as optional behavior, this being non-automatic action. (Optional behavior consists of actions a DLF 32 can perform if and only if its necessary actions such as eating have been completed successfully, thus ensuring it has sufficient EPs 66 to stay alive. This is necessary because there are a unlimited number of potential concepts 106, and a DLF 32 could actually die by "thinking" too much.) But what the computer 12 cannot do on its own is to come up with a real language word. The computer 12 could come up with its own word, but then it would have to be translated in order for the computer 12 to communicate with people in the real world. In order to provide real English word, a human tutor should interact with the DLF much like a child would learn. The ability to decode and encode sentences depends on both words and concepts, because the chains of concepts 106 connecting them to percepts 67 is the meaning of the words. The DLF 32 will perceive words as objects 60 and can form concepts 106 of both objects 60 and their relationships, as well as sentences and the parts of sentences. (The sentences themselves are just another form of perceptual object 60 in this system.) This process is represented diagrammatically in a word association operation 110 in FIG. 7, wherein a concept 106 is associated with a word, as discussed above. Once concepts 106 are formed, as shown in FIG. 7, the encoding of a sentence may follow. This is a process that starts with objects 60 and connects them to the words that make up the sentence. Reversing the arrows would be the decoding of a sentence, essentially by reconnecting the words in the sentence to objects 60 in reality. Both processes operate by tracing previously calculated conceptual chains 112, or in some cases, by calculating new ones. In the view of FIG. 8 it can be seen that each of the concepts 106 is represented by a natural language word 112 in the concept chain 112. Simulated perception, concept formation, and the processes of encoding and decoding sentences, taken together as described herein, solve the problem known in the state of the art as natural language understanding and production. It should be noted that, as discussed above, the DLF 32 can form concepts on its own without human intervention as one of its optional actions 40. The human contact is only required to enable the use of natural languages, as described.

Various modifications may be made to the invention without altering its value or scope. For example, alternative or additional actions, methods, and the like might be used instead of or combined with those described herein. One additional action method could be the ability to compare a wider variety of characteristics of the objects 60 a DLF 32 perceives, to make the DLF 32 better able to group and abstract percepts by similarity. Another example of an obvious modification would be to incorporate the invention into a robotic device or other such machine that better simulates human sensors, brain, and the ability to identify objects in the real world, instead of the general purpose computer used in the example of this disclosure.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

INDUSTRIAL APPLICABILITY

The inventive simulated awareness methods 10 and 10a are intended to be used in ever increasingly complex forms to eventually result in a DLF 32 which can interact with humans and the "real" world in which we live, thereby resulting in a program which appears to have consciousness and which can solve problems for which it is not specifically programmed.

A relatively short development time is provided for, since this invention copies many design ideas from real life forms, instead of attempting to re-evolve them to recapitulate evolution in some manner, such as is attempted by genetic algorithms, and the like. In other words, just as the AL researchers did not re-evolve the gait of insect robots, but rather reverse engineered their operation by copying real life forms, so this invention seeks to reverse engineer the simulation of goal directed behavior and consciousness rather than re-evolve it. A key is to identify the essential elements and program substitutions. This is the pre-defined part of the simulation system. This aspect of the design involves identifying the necessary and sufficient set of elements to develop the substitutions for, and then writing the software code for those elements. This self defining stage of the development of the simulation system is the management and tutoring of those basic elements as they simulate the active processes of life and consciousness.

The inventive method can be practiced using a reasonably powerful desktop computer with at least 64 MB of memory, a 1 GB hard disk drive, and an object oriented programming environment to write a goal directed program that simulates a life form. Writing a program to simulate goal directed behavior on the computer system 12 amounts to creating the DLF 32 and the simulated environment 30 in which the DLF 32 will live.

Simple simulations involving a few thousands of percepts 67 would require less computer resources and could be done on a high end PC, but complex simulations of higher life forms that involve millions of percepts 67 for natural language understanding could require a more powerful computer system, such as those used for large Internet servers.

A simulated or virtual environment can be made very sophisticated and is easier and less expensive than using a real one, because it can exist entirely in a computer's memory, so no external sensors or actuators are needed. To simulate high order functions such as rational consciousness accurately, a DLF 32 will eventually have to interact with the same world that human beings do, including interaction with people. However, simulations of simpler DLFs 32 do not require real world contact. Both simple and complex simulations that use external robot technologies are possible with today's technology, and will become even more realistic in the technical improvements that will come in the near future.

The present invention is based, in part, on the concept that knowledge, in order to be objective, has to be connected to reality (what is perceived). Every object has an identity which is unique, objects interact with one another. This is referred to as causality. Causality is not merely one event following another. Rather, interaction of the identities of objects is causality. There are essentially two types of objects—non living and living. Non living objects are totally externally driven. They exist unconditionally, whereas living objects exist conditionally. Certain actions they must take or they die and cease to exist. This makes them a different kind of entity, with different kind of causality. A DLF 32, according to the present invention, like a real life form, can have optional behavior. Once the DLF 32 has satisfied survival needs, it is free to do what it wants. It can engage in more survival action, can do nothing, do random actions, or the like. Alternatively, like human beings, the DLF 32 can form concepts 106—it can look around the world and learn. In both DLFs 32 and humans there are two types of behavior. The first of which is necessitated for survival which, even though "automatic" in a goal directed, biological sense, is different from that of mechanistic automatons, because it is teleological. To be biological is to be internally powered and regulated.

Since the life form, simulated or real, must maintain its survival by internal self regulation, it must take such necessitated actions and, in order to do so it must be able to see (or sense) its environment to identify objects that exist there and predict likely outcomes of its actions (set goals). There will be a survival advantage in taking raw data and integrating it into percepts 67 and then into concepts 106, since the DLF 32 will be able to learn from its experience thereby, and since concepts will allow the DLF 32 to act based on generalities, and the like, thereby reducing the number of calculations required because percepts and concepts are stable, invariant condensations of what is sensed in a highly dynamic outside world. As discussed previously herein, concept formation is among the second, optional, types of behavior which, while not immediately necessary for survival, might well enhance the likelihood of survival of the DLF 32 in the long run (as it does in fact for humans). Because such optional behaviors must be planned for the DLF 32 by the programmer, they will be limited in quantity as compared to a nearly infinite variety of possible (and emergent) optional behaviors that will be possible once the DLF 32 has formed a multitude of concepts 106. However, as discussed herein, it is important that the DLF does have at least some such optional behaviors from the start.

It should be noted that the DLFs differ significantly from what many seem to consider to be "life forms". That is, it would not be correct to lump real life-forms, computers, life-forms simulated primarily to attain human goals, and life-forms simulated to primarily attain their own goals all into the same category. Although this present invention may "look" like a state of the art simulation of life, such as is represented by Heleno et al, "Artifical Animals in Virtual Ecosystems", published in Computer Networks and ISDN Systems, Volume 30, Issues 20-21, November 1998, pages 1923-1932, such a comparison would not be valid due to significant differences. The same is true for sense perception (which is often incorrectly lumped in with sensations and bitmaps), and for concept formation (which nearly everyone is taught is simply a case of either intuition or of making up a definition base on a rational that can be sold to enough other people to get accepted). Concept formation is almost never taught as a quasi-mathematical method that is based on direct observation of reality as it is used in this invention.

Computer systems, including so-called "autonomous agents" are mechanistic, whereas life-forms are teleological, or goal directed in the sense of being self-regulating. The system described by Heleno et al., for example, is a study and educational tool created to provide "dynamic pictorial information" to people who then find it is "easily interpreted by a human being and clarifies the behavior of the interactions." The so-called "goals" of the animals in the model are merely variables that make it easier for scientists to have a "reproduction of natural phenomena" in their labs. They are an artifact of a subject being studied. They are not the "goals" of the actual life-forms to be used for the life-forms' own survival purposes. If the system described by Heleno et al. were used to study the behavior of small fires spreading and joining into an inferno, the subject of goals would not be involved, for fires are not life-forms. Yet it would work all the same, because Heleno et al. makes no distinction between mechanism and teleology. That is, simulations such as described by Heleno et al. assume that life is inherently mechanistic. Similarly, simulations designed to display behavior, such as the popular "artificial pet" simulations, while useful for their own purposes, are not comparable to the present invention. The inventive DLF system is much broader and more complex because it can simulate life forms in general. In addition, such machine simulations are a "machine" by definition, which means that they are non-teleological by definition, and are therefore incapable of goal-directed action for its own sake. Moreover, in such simulations the relationship of the machine to a human being is one of being a "user." By inference, therefore, an "electronic pet machine" or the like, has no goals that it acts to achieve for its own sake, but like the animals in the Heleno et al. system, they are merely a tool to help its human "user" achieve human goals. By comparison, the inventive DLF system will be used by humans to help achieve human goals in the same sense that real animals such as horses are, because DLFs (like real horses) are teleological, DLFs will primarily act to achieve their own goals and only secondarily act to help achieve human goals. This point also applies to the question of simulated feelings. These simulated feelings do not exist for the sake of the pet machine itself, they exist only for the sake of their effect on the human user. Whereas, the simulated feelings of pleasure and pain in the DFL system function primarily as warning indicators for the life status of the DLFs themselves, and only secondarily as for human users.

The distinction between the mechanistic and teleological action is not mere semantics. It has been studied and argued extensively in the literature. Non-living objects exist unconditionally, they function by simple mechanistic or "billiard ball" causality, and they do not act to maintain their existence. For biological life-forms their very existence is conditional: They must act to remain alive and in existence, in fact, to cause their own future existence. Moreover, they must act in very specific ways. A more complex causal explanation is required than simple mechanistic causality provides. Therefore, another important difference is that this present invention simulates the more complex form of causality that makes biology possible at all, whereas simulations of life forms in Heleno et al, and the like do not.

The inventive DLF system rests on the premise that computer technology cannot have the attributes of a life-form, such as conscious behaviors, based on a purely mechanistic design. Artificial Intelligence (AI) and Artificial Life (AL) design strategies are oversimplifications of the reality of life processes because they ignore teleology (goal-directed action), except insofar as it furthers human goals. Thus the state of the art design strategies preclude digital life-forms that live for their own sake from the outset. All state of the art systems known to the inventor exist for the sole purpose of satisfying human goals,. not goals of the simulated life-forms they mimic.

If the purpose of simulating hunger in the inventive DLF system were simply to create a pet simulation machine it might be comparable to the appearance to humans of a "pet machine", or the like, taking action to satisfy hunger or of behaviors that make the pet machine appear full or to have more energy after eating. But that is not the purpose of simulating hunger in the inventive DLF system. Rather the purpose is to simulate an active metabolism in a conditionally existing DLF for the ultimate purpose of simulating teleological goal causation. In other words, a simulated "pet machine" might eat and later look satisfied and have more energy because it is scripted to satisfy the observational needs of the human user. Alternatively, the inventive DLF eats because it is simulating hunger in the manner of a real animal, and is driven by its pain system to do so with the goal of causing its own survival as seen from its own internal perspective.

Similarly, prior art AI systems, and the like, are designed to be an easy to use modeling and study tool or a pet machine, but not to simulate the actual teleological causation of biology as is the inventive DLF system. In known prior art systems, all the functions are clearly designed for use by humans, not for the animals or pet machine to identify reality for their own sake, for their own goals, and from their own perspective. The emphasis here is clearly on the ease of use of the system for human users (scientists, students, pet machine owners, etc.), not the value of sense perceptions of the actual animals in the simulation itself from the animals' own perspective. Whereas, in the inventive DLF system, the whole purpose of having sense perceptions in the first place is to enable DLFs to gain the identity information about objects in the outside world so that DLFs can survive, because they need to identify reality so that they can take action to cause their own future existence, as opposed to help some scientist write his papers or play with an artificial pet.

Sense perceptions in AI simulation type machines, as is typical in the known state of the art, are simply bitmaps and quantities in variables. However, in the inventive DLF system sense perceptions are computed from bitmaps or variables while using them as data, but are not bitmaps themselves. From the perspective of DLFs, these sense perceptions ARE objects in the world, not quantities in variables. Moreover, consciousness is simulated using this more complex perceptual data type. In the DLF demonstration program embodiments created to date, these computed percepts are simple lists, but as they function in the DLF system they are a data type that is new to the art and designed specifically for this purpose. Other non-list based future designs are possible (such as more complex perceptual forms of objects produced by a Reality Identification Cortex that better simulates the human brain), but the point is that simulated consciousness of DLFs will not be "conscious" of a database of simple variables or bitmaps, they will be "conscious" (from their perspective inside the system) of percepts that consist of a foreground of objects against a background of other objects, real world objects that have real characteristics or features that make up their identities, such as those that people can and do perceive when they look at trees and rocks and cars and other people or hear words spoken as "sound objects," not as text strings consisting of bits. In DLF simulated percepts, each characteristic or feature in these multi-feature data objects will consist of an invariant property and a value measurement that can then be used in later computations, especially those used for forming (calculating) concepts according to a specific, quasi-mathematical method.

In the state of the art, consciousness is defined as either various kinds of spiritual mysticism or in science as a transparent eppi-phenomenon with no identity of its own. Ayn Rand was the first person to recognize consciousness as a process of awareness when she said in her book Introduction to Objectivist Epistemology: "Consciousness IS Identification." That is, identification done by a life-form from the perspective of the conscious life-form doing the identifying, not some outside user. By "identification," she means identification of objects, the ordinary things everyone sees in the world. By process, she means an identify-able series of steps like any other process that is performed by the brains of certain life-forms. In addition, she defines "percepts" as the output of this process and as "a group of sensations automatically retained and integrated by the brain of a living organism." (Note: The term "automatic" is used here in the context of biological, goal-directed, automatic behavior of life-forms, not the computational idea of mechanistic automatons.) The DLF system is designed to animate the process of conscious perception in simulation, as it was conceived by Ayn Rand by substituting the mechanisms of a computer system for the mechanisms of physics and chemistry that animate life-forms, with special programming added to simulate goal directed behavior. In the DLF system, "sensations" are analogous to bitmaps or variable definitions in prior art systems, but they are simply used as a starting point and as data. There is then additional processing to simulate the "integration, retention, and identification" parts of Rand's process explanation of how consciousness works in life-forms. This design is very different from the "sense perceptions" in Heleno are intended to model virtual ecosystems and produce: "dynamic pictorial information". . . that provides a "visualization of a natural environment in a VR system."

Since the simulated consciousness method 10 of the present invention may be readily produced and integrated with existing computer systems and sensing devices, and the like, and since the advantages as described herein are provided, it is expected that it will be readily accepted in the industry. For these and other reasons, it is expected that the utility and industrial applicability of the invention will be both significant in scope and long-lasting in duration.

I claim:

1. A computer based entity usable as a robot control system, the computer based entity comprising:

memory;

at least one sensor capable of discerning characteristics of objects in an environment;

a perceive routine stored in the memory and operative to form percepts and store the percepts in the memory, each percept associating the discerned characteristics of a respective one of the objects, the perceive routine being further operative to identify subsequently encountered objects by comparing discerned characteristics of the subsequently encountered objects with the stored percepts;

a plurality of attributes stored in the memory, wherein at least one such attribute defines the vitality of the entity;

a plurality of action routines stored in the memory and operative to invoke actions by the computer based entity, at least one of which will affect the vitality of the entity; and an action selection routine stored in the memory and operative to select one of the actions when one of the objects is perceived and to store data associating the perceived object with the subsequent effect of the selected action on the attributes, the actions being selected based on a likely effect on the vitality of the entity, the action selection routine randomly selecting an action when there is insufficient stored data to determine the likely effect of a particular action on the vitality of the entity.

2. The computer based entity of claim 1, wherein:

simulated death occurs when the actions result in a reduction of vitality below a preset level; and the action selection routine chooses such actions with a primary goal of avoiding the simulated death.

3. The computer based entity of claim 1, wherein:

vitality level is determined by a quantity of energy packets.

4. A computer interface, comprising:

a computer hosting resources for access by a user;

a user input device;

memory;

a simulated digital life form stored in the memory and having a plurality of attributes, including at least one attribute indicative of the vitality of the digital life form;

code stored in the memory and operative to provide a plurality of actions which may be accomplished by the digital life form; and a selection criteria for selecting from said plurality of actions, said selection criteria being stored in the memory; wherein repeated selection of actions which do not contribute to the vitality of the digital life form will result in the simulated death of the digital life form, and said digital life form perceives a plurality of objects in an environment including input from the user input device;

said objects are identified by the digital life form by comparing percepts previously formed and stored in the memory by the digital life form with present percepts of said objects;

the percepts are perceived properties of the objects by the digital life form; and said actions are selected primarily to optimize vitality dependant upon the particular objects perceived so as to benefit the digital life form wherein benefit is defined as serving the needs of the digital life form by keeping it alive, and said actions are selected secondarily to respond to the input from the user input device.

5. The computer interface of claim 4, wherein:

some of said attributes function as simulated feelings that serve as warning indicators for the effect of certain actions on the vitality of the digital life form; and said actions are taken to optimize at least one of a plurality of simulated feelings.

6. The computer interface of claim 5, wherein:

at least one of the simulated feelings is a feeling of fullness.

7. The computer interface of claim 6, wherein:

the feeling of fullness is represented by a quantity of energy packets.

8. A computer program product comprising a computer usable medium having a computer readable program code embodied thereon configured in operate on a computer, comprising:

code to cause the computer to keep track of a list of attributes of digital life form, at least one of the attributes being indicative of the vitality of the digital life form;

code for causing the digital life form to form precepts associated with objects and to store the percepts, the percepts including data indicative of characteristics of the associated objects;

code for causing the digital life form to formulate and store concepts based on at least two of the percepts associated with at least three objects; and code to cause the digital life form to take actions based upon the concepts with a primary goal of maintaining its own vitality and to take a random action when the stored concepts are insufficient to determine whether a particular action will further the primary goal of maintaining its own vitality.

9. The computer program product of claim 8, wherein:

at least some of the concepts are defined by a human tutor.

10. The computer program product of claim 8, wherein:

said actions are selected from a list of actions programmed into the computer.

11. The computer program product of claim 8, wherein:

at least one consequence of the selection of said actions is the termination of the digital life form.

12. The computer program product of claim 8, wherein:

at least one of the attributes of the digital life form is a simulated feeling that serves as an indicator of the effect of a particular action on the vitality of the digital life form.

13. A method for creating a digital life form, comprising:

defining a digital life form;

providing access for the digital life form to an environment;

defining a plurality of potential actions for the digital life form;

providing at least one object in the environment;

providing the object with at least one characteristic;

providing the digital life form with the ability to form percepts based on the characteristics of objects encountered, to store the formed percepts, and to use the stored percepts to identify subsequently encountered objects;

providing the digital life form with the ability to select from said plurality of potential actions based, at least in part, on the percepts; and providing consequences to the digital life form for such actions; wherein the digital life form selects from said plurality of potential actions in order to avoid certain of the consequences with a primary objective being the continued existence of the digital life form;

the digital life form arbitrarily selects an action when there is insufficient data to determine whether an action will further the primary objective; and the digital life form stores data indicative of the effectiveness of selected actions in furthering the primary objective for use in future action selections.

14. The method of claim 13, wherein:

said digital life form includes a plurality of attributes, the attributes containing values indicative of particular needs of the digital life form.

15. The method of claim 13, wherein:

said environment is a computer generated simulated environment.

16. The method of claim 13, wherein;

at least one of said actions includes EAT.

17. The method of claim 16, wherein:

EAT is defined as assimilating energy packets to increase the vitality of said digital life form.

18. The method of claim 13, wherein:

at least one consequences of said actions is the simulated death of said digital life form.

19. The method of claim 13, and further including;

providing a strategy for selecting from said plurality of actions.

20. A computer-implemented method for simulating consciousness, comprising:

identifying perceived characteristics of objects in an environment based on perceptions of the objects, the perceptions obtained by experiencing the objects;

storing lists of said characteristics; and forming concepts by comparing similarities in the perceived characteristics;

wherein said steps of identifying, storing and forming are performed by said computer.

21. The method of claim 20, and further including:

acting on at least one of said objects according to the perceived characteristics of that object for the self benefit of an entity achieving the simulated consciousness.

22. The method of claim 20, wherein:

said lists are percepts.

23. A method for forming concepts in a Digital Life Form, comprising:

forming percepts based on perceived characteristics of objects;

using said perceived characteristics to form concepts; and acting on said concepts for the benefit of the Digital Life Form, itself.

24. The method of claim 23, wherein:

concepts are compared to form other concepts in hierarchical conceptual chains.

25. The method of claim 23, wherein:

concepts are associated with natural language words.

26. The method of claim 25, wherein:

natural language words are associated into phrases, the meaning of which is the union of the concepts and one or more conceptual chains that ultimately connect all the concepts in said conceptual chains to the associated percepts.

* * * * *